(12) United States Patent
Weinstein et al.

(10) Patent No.: US 8,287,262 B2
(45) Date of Patent: Oct. 16, 2012

(54) METHODS AND APPARATUS FOR PRODUCING MULTIPLE FOOD EXTRUDATES

(75) Inventors: James N. Weinstein, Maple Grove, MN (US); Kevin Wright, Crystal, MN (US)

(73) Assignee: General Mills, Inc., Minneapolis, MN (US)

( * ) Notice: Subject to any disclaimer, the term of this patent is extended or adjusted under 35 U.S.C. 154(b) by 227 days.

(21) Appl. No.: 12/758,441

(22) Filed: Apr. 12, 2010

(65) Prior Publication Data

US 2011/0250337 A1   Oct. 13, 2011

(51) Int. Cl.
*B29C 47/04* (2006.01)

(52) U.S. Cl. ............... 425/131.1; 425/198; 425/382 R; 425/382.4; 425/463; 425/464

(58) Field of Classification Search ............... 425/131.1, 425/131.5, 198, 199, 204, 206, 382 R, 382.2, 425/382.4, 463, 464
See application file for complete search history.

(56) References Cited

U.S. PATENT DOCUMENTS

| | | | |
|---|---|---|---|
| 4,372,734 A * | 2/1983 | Dolan et al. | ............ 425/131.1 |
| 5,639,485 A | 6/1997 | Weinstein et al. | |
| 5,643,618 A | 7/1997 | Huberg et al. | |
| 5,752,364 A | 5/1998 | Benham et al. | |
| 5,776,534 A | 7/1998 | Christensen et al. | |
| 5,827,557 A | 10/1998 | Weinstein et al. | |
| 5,843,503 A | 12/1998 | Clanton et al. | |
| 5,919,509 A | 7/1999 | Cremers et al. | |
| 6,143,338 A | 11/2000 | Weinstein et al. | |
| 6,143,339 A | 11/2000 | Weinstein et al. | |
| 6,143,342 A | 11/2000 | Weinstein et al. | |
| 6,167,798 B1 * | 1/2001 | Weinstein et al. | ............ 99/353 |
| 6,189,439 B1 | 2/2001 | Weinstein | |
| 6,251,452 B1 | 6/2001 | Weinstein et al. | |
| 6,387,421 B1 | 5/2002 | Clanton et al. | |
| 7,140,292 B2 * | 11/2006 | Parsons et al. | ............ 99/516 |
| 7,320,583 B2 | 1/2008 | Bortone et al. | |
| 2004/0156954 A1 | 8/2004 | Maheshwari et al. | |
| 2008/0089989 A1 | 4/2008 | Chatel et al. | |
| 2010/0055274 A1 | 3/2010 | Weinstein et al. | |

* cited by examiner

*Primary Examiner* — Yogendra Gupta
*Assistant Examiner* — Joseph Leyson
(74) *Attorney, Agent, or Firm* — Everett Diederiks, Jr.

(57) ABSTRACT

An apparatus (10) for forming a single extrudable food stream such as a cooked cereal dough into a plurality of differently colored and/or flavored dough streams is disclosed including an extruder (12) having screw augers (15) for advancing a plastic food mass, a head or manifold (118) for dividing the plastic food mass into a plurality of substreams each in turn in fluid communication with a plurality of sub-divided dough passageways, and a die head (30) having a plurality of die ports (40). Each subpassage is separately supplied an additive and has disposed therein a multiplicity of in-line static mixer elements (59) to admix the additive into the substreams of the plastic food mass before passage through the die ports (40). In a preferred form, first and second substreams are intermixed in a non-homogenous manner before reaching the exit ports (40). The extrudates are severed into individual pieces (158) by a rotary cutter (36).

13 Claims, 5 Drawing Sheets

METHODS AND APPARATUS FOR PRODUCING MULTIPLE FOOD EXTRUDATES

FIELD OF THE INVENTION

The present invention generally relates to food processing apparatus and methods. More particularly, the present invention relates to apparatus and methods for dividing and coloring and/or flavoring a continuous stream of extrudable food material into a plurality of non-homogenously mixed substreams each of a distinct color and/or flavor.

BACKGROUND

Extruders are often used in the preparation of various food products and especially in the preparation of ready-to-eat ("RTE") cereals such as puffed. Extruders, especially cooker extruders, are desirable because a single machine can produce large quantities of a cooked cereal dough in a short period of time. Such cooker extruders can be used to prepare cooked dough extrudates which can thereafter be formed into individual cereal or snack pieces, with the formation of such pieces possibly involving puffing the pieces to form finished puffed RTE cereals. In another variation that is increasingly popular, the conditions of the extruder and the cooked cereal dough are such that the dough puffs immediately upon being extruded and is cut into individual puffed pieces at the die head. Such a process is referred to generally as "direct expansion."

While the preparation of a puffed or "direct expanded" extrudate is desirable, it may be desirable to produce a variety of products having different colors, flavors, or similar additives. For example, RTE cereal blends that comprise a mixture of differently shaped pieces are desirable, with each shape having a distinctive color and/or flavor.

In current practice, in order to produce an RTE cereal blend of distinctive colors, shapes or flavors, a sequence of individual color/flavor runs are made. The product from each run is collected and subsequently admixed to form the blend. For instance for a direct expanded product, a first colored cooked cereal dough is prepared by adding color to the starting material or by injecting a color into the dough upstream of the dieface. The colored dough is directly expanded through a shaped dieface and face cut as it expands to form individual pieces. To prepare, for instance, a second color and shape, the first color injection is discontinued and a second different color material is injected into the cooked cereal dough. To prepare a second shape, the first die head is removed and substituted with a die head having the desired second shape.

While effective, one problem with this conventional practice resides in the generation of unusable scrap material during the color addition transition as the new color is admixed with the residual amounts of the prior color. Still more scrap is generated as the extruder comes up to steady state conditions after the second color run is started. A second problem is that the various colored pieces must be collected in large batches to be admixed at a later time to form the blended RTE cereal. The properties (e.g., plasticity, temperature, moisture content, starch conditions, frangibility, etc.) of the finished pieces may deteriorate over the storage period. A third problem relates to the broken pieces, dust and/or cereal fines created by the admixing step.

As shown by the continuing market success, the methods and apparatus of U.S. Pat. No. 5,919,509 were a major advancement in the art to overcome the problems previously faced in the preparation of various food products. However, there is continuing need to provide food products having novelty in form to maintain or enhance market share.

It would thus be desirable to be able to provide a multiplicity of streams of mixed, non-homogenous cooked cereal dough from a single extruder, with each of the streams having a distinct color, flavor and/or similar additive.

SUMMARY

This need and other problems in the field of providing cooked cereal dough is solved, in the most preferred form, by directing first and second product mass substreams into first and second channels each having subpassages directing the first and second product mass substreams into a static mixer and then through a die port.

In most preferred aspects, it is an object of the present invention to provide apparatus and methods for providing a plurality or multiplicity of dough streams from a single extruder wherein each of the streams has a mixed, non-homogenous, distinct, physical or compositional properties such as color, flavor (e.g., cocoa, cheese or fruit flavored, salt), nutrition (e.g., high on low fiber, vitamins, minerals, nutriceuticals), texture, or the like.

The present invention will become clearer in light of the following detailed description of illustrative embodiments of this invention described in connection with the drawings.

DESCRIPTION OF THE DRAWINGS

The illustrative embodiment may best be described by reference to the accompanying drawings where.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DESCRIPTION OF THE PREFERRED EMBODIMENTS

Figure 1:
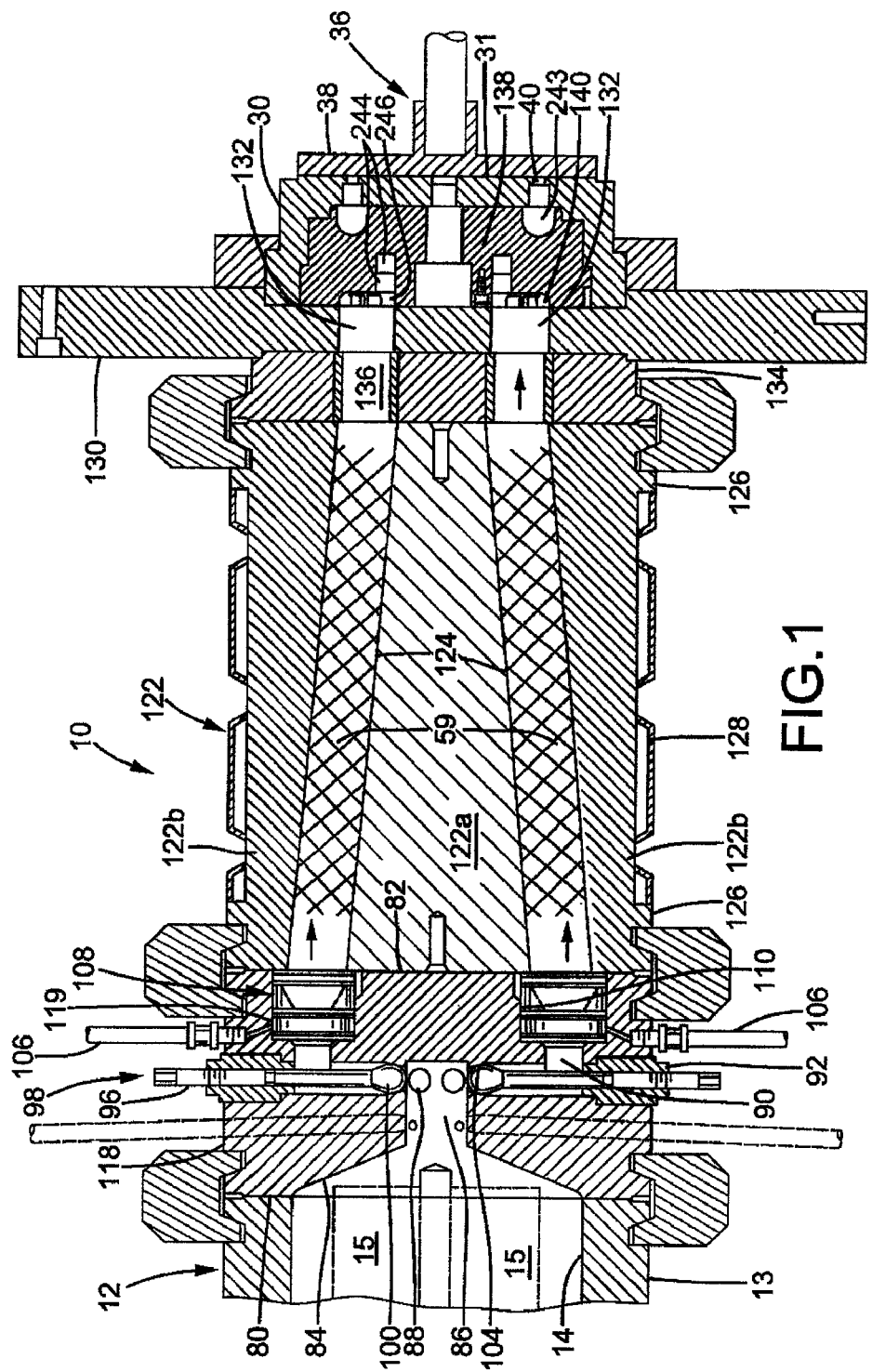
FIG. 1 is a sectional view of a food apparatus according to the preferred teachings of the present invention for forming multiple colored extrudates from a single extruder.
Figure 2:
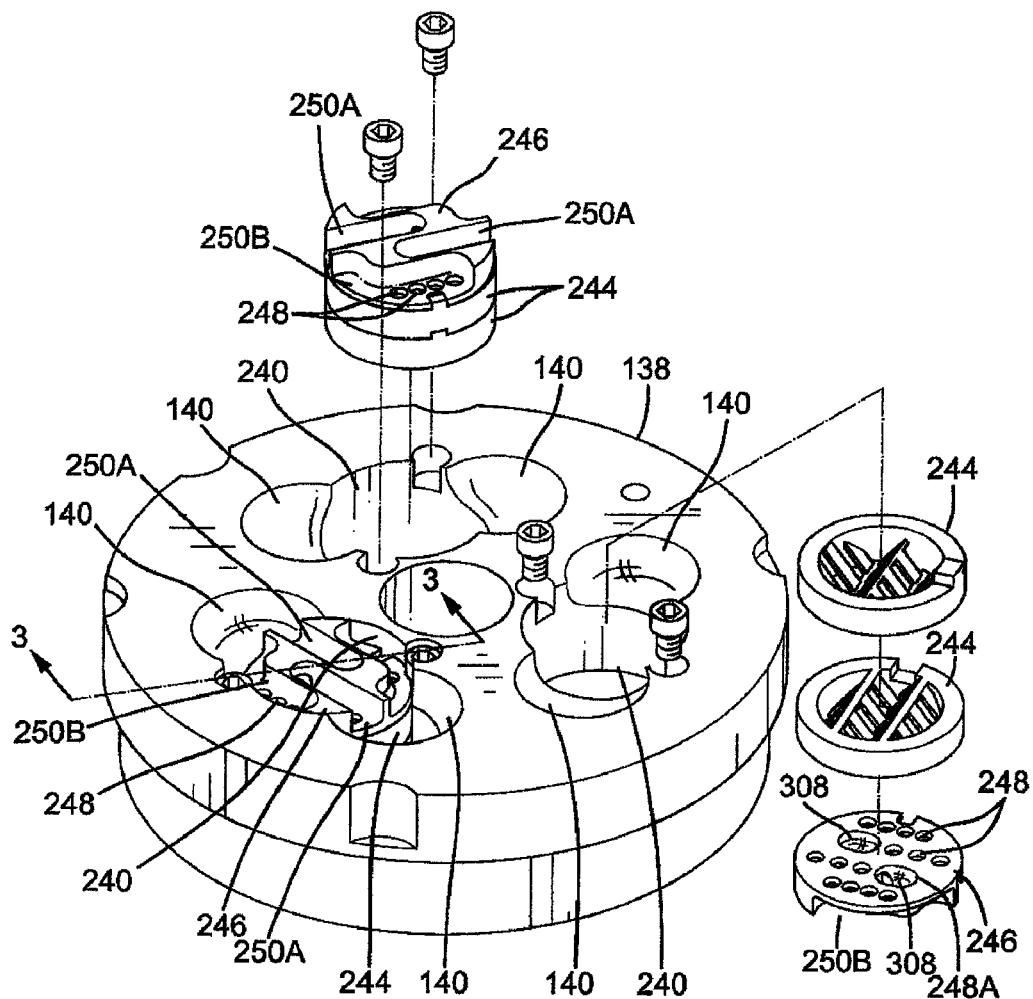
FIG. 2 is a partial, exploded, perspective view of the apparatus of FIG. 1.
Figure 3:
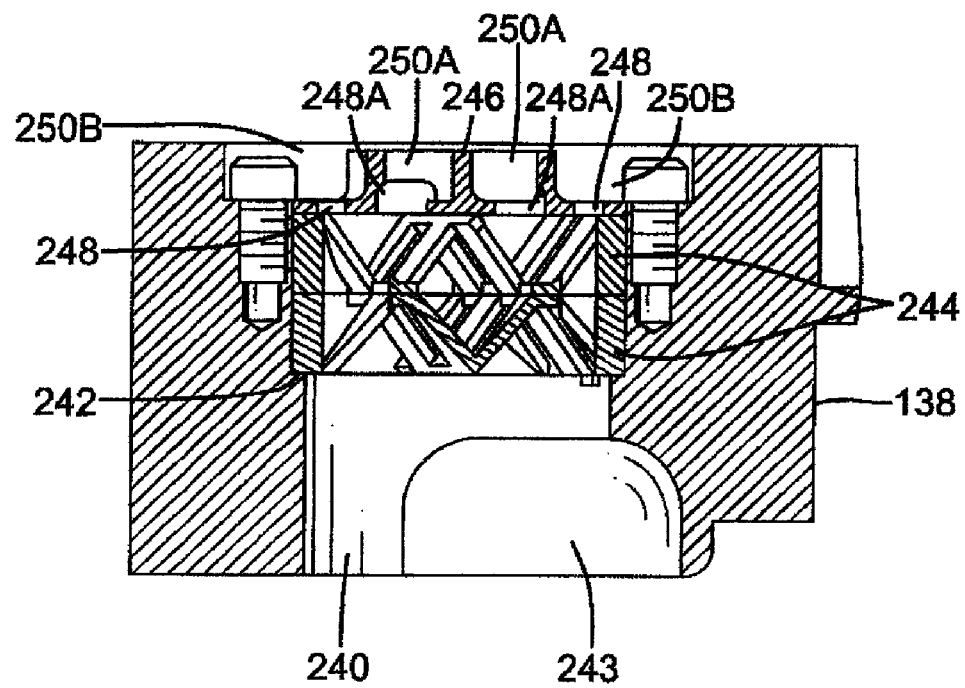
FIG. 3 is a cross sectional view of the apparatus of FIG. 2 according to section line 3-3 of FIG. 2.
Figure 4:
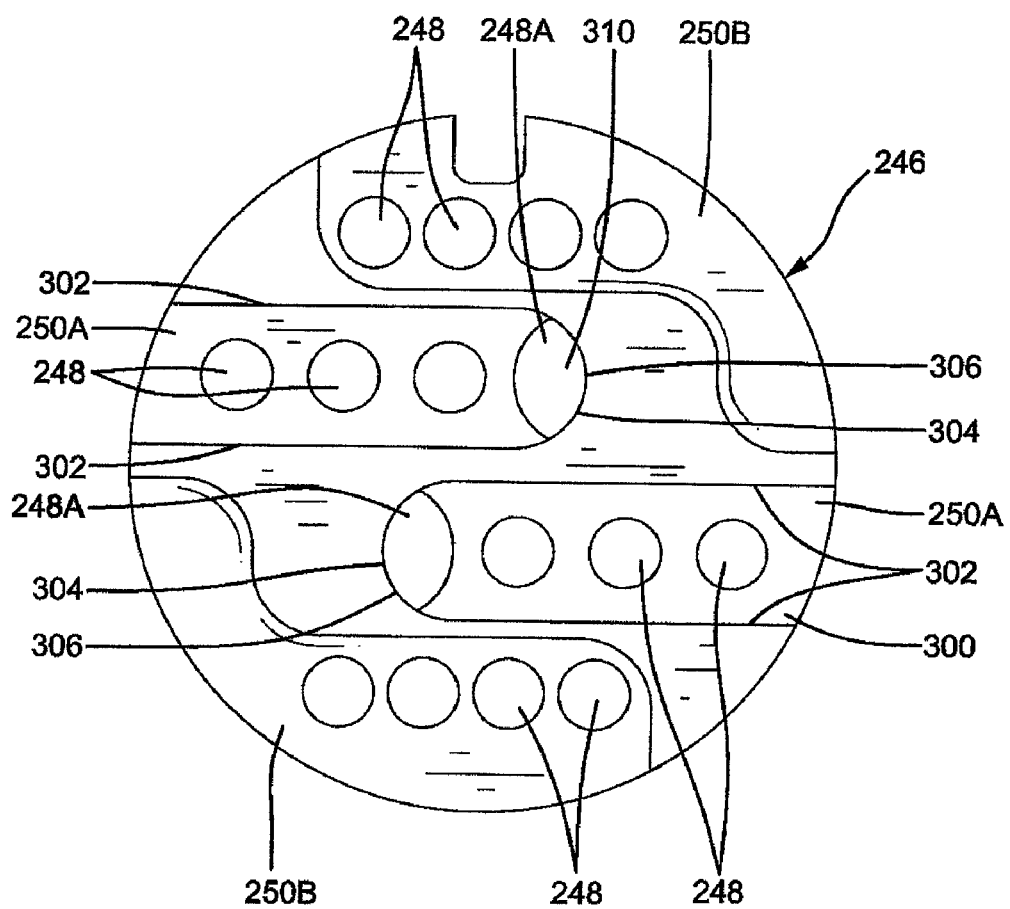
FIG. 4 is a partial, top view of the apparatus of FIG. 2.
Figure 5:
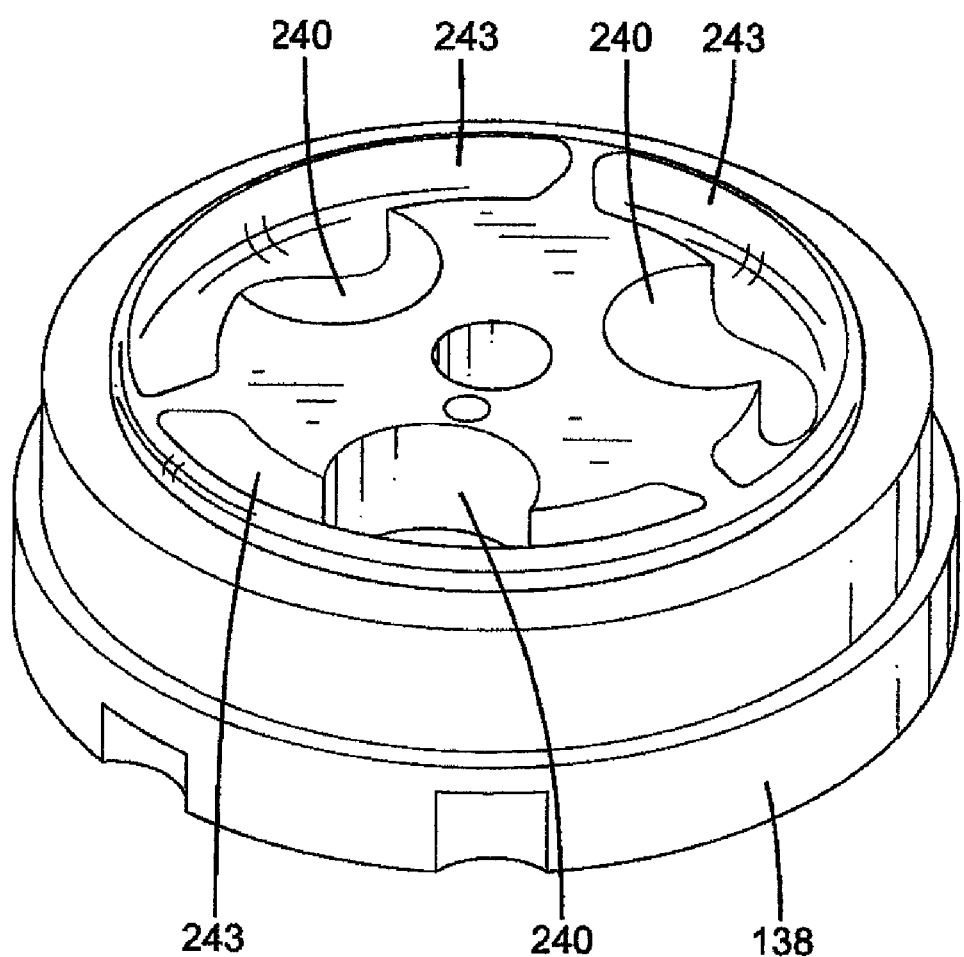
FIG. 5 is a bottom, perspective view the apparatus of FIG. 2.

Referring now to the drawing and briefly in particular to FIG. 1, there is shown an apparatus 10 for providing a multiplicity of mass substreams of a plastic food material from a single product mass main supply, with each of the streams having a mixed, non-homogenous color and/or flavor, according to the preferred teachings of the present invention. In the preferred form, apparatus 10 generally includes a means for providing at least one extrudable food product in a mass stream such as an extruder 12 and a head or manifold 118. The present invention finds particular suitability for use in connection with the provision of cereal doughs and especially cooked cereal doughs for the production of RTE cereals or grain based snacks. While the extruder 12 preferably a cooker extruder, is the preferred equipment to provide the extrudable food, other conventional equipment and techniques can be employed. For example, a batch cooker or semi-continuous cooker for cooking the ingredients in bulk can be equipped with a dough forming and conveying extruder element. In other embodiments, e.g., a low moisture fruit paste or a pasta dough, a simple screw conveyor can be employed.

Moreover, while in the present description particular reference is made to the provision of multiple extrudates of farinaceous materials such as cooked cereal doughs for the preparation of RTE cereals, the skilled artisan will appreciate that the present apparatus and techniques can be employed with a wide variety of extrudable food products, especially such plastic foods as 1) low moisture fruit products, 2) uncooked cereal doughs such as for pasta, cookies, or breadstuffs, 3) potato doughs such as for fabricated potato snacks, 4) chewing gums, 5) cheeses and cheese products, or 6) yogurts.

Extruder 12 can be any convenient type of food extruder for providing the extrudable food product. While single screw extruders are useful herein, FIG. 1 shows the preferred embodiment wherein a twin screw cooker extruder 12 is employed. In particular, extruder 12 can be seen to include an extruder barrel 13 having a main passageway 14. Disposed within passageway 14 is a twin screw auger 15 for advancing the extrudable food material through a discharge outlet, with twin screw auger 15 in the preferred embodiment including a first and second or twin screw intermeshed flights.

According to the preferred teachings of the present invention, apparatus 10 includes the head or manifold 118 for dividing the dough stream of extruder 12 into six substreams. In particular, manifold 118 includes an upstream face 80 and a downstream face 82. Manifold 118 is suitably secured to extruder 12 such as by the means shown with upstream face 80 abutting with the downstream face of extruder 12. Manifold 118 includes a first frustoconical-shaped passage 84 which terminates in a cylindrical-shaped passage 86. Passage 84 extends from face 80 towards but spaced from face 82 and receives the extrudable food material being advanced by twin screw auger 15. Passage 86 extends from passage 84 towards but spaced from face 82, with passage 86 terminating approximately midway between faces 80 and 82 in the most preferred form.

Manifold 118 according to the preferred teachings of the present invention includes a plurality of radially extending, equally circumferentially spaced bores 88 extending from the outer periphery and intersecting with passage 86. In the most preferred form, 6 bores 88 are provided. Manifold 118 further includes a plurality of axially extending passageways 90 extending from face 82 and terminating in bores 88. Passageways 90 in the preferred form are arranged in a circular pattern on face 82, with passageways 90 being equally circumferentially spaced.

Bores 88 are counterbored from the periphery of manifold 118 to a point radially outward of the intersection with passageways 90 for threadably receiving a cylindrical-shaped plug 92. Suitable means such as O-rings as shown can be provided for sealing between plugs 92 and bores 88 to prevent the escape of extrudable food material therebetween. The inner surfaces of plugs 92 each threadably receive the stem 96 of a restrictor 98. The inner radial ends of stems 96 terminate in a pear-shaped head 100. Suitable means such as O-rings as shown can be provided for sealing between stems 96 and the inner surfaces of plugs 92 to prevent the escape of extrudable food material therebetween.

In the most preferred form, bores 88 each include a frustoconical-shaped seat 104 adjacent to their interconnection to passage 86. It can then be appreciated that stems 96 can be rotated in plugs 92 to adjust the position of head 100 relative to seat 104 between an abutting position which prevents passage of extrudable food material from passage 86 into bores 88 to a retracted position where extrudable food material is allowed to pass from passage 86 into bores 88 and around head 100. It should be appreciated that the further that head 100 is withdrawn from seat 104, the greater the rate of flow of the extrudable food material. Further, it should be appreciated that each of the restrictors 98 can be independently adjusted so that the flow of extrudable food material through each of the bores 88 can be adjusted. In the most preferred form, it is desired for the flow of extrudable food material to be generally equal through all of bores 88.

In the most preferred form, each passageway 90 includes its own independent additive supply 106. Supply 106 is in fluid communication with and manifold 118 further includes means for adding the additive at multiple locations within the flow of extrudable food material such as a die insert 108 shown. In the preferred form, each passageway 90 includes an enlarged size counterbore 110 extending axially from face 82 towards but spaced from bores 88 and at a distance generally equal to the axial length of die insert 108. In the most preferred form, die insert 108 is generally of the type shown and described in U.S. Pat. No. 5,643,618. In particular, die insert 108 includes means for imparting at least one and more desirably a plurality of dough interstitial gaps such as a plurality of dough dividing passageways formed by die dividing members. Die insert 108 can further include means for injecting the additive into the interstitial dough gaps such as a plurality of injection ports. Die insert 108 can further include a supply reservoir 119 supplied by supply 106, with supply reservoir 119 defined by the outer surface of die insert 108 and counterbore 110, with suitable means such as O-rings preventing escape of the additive therebetween. Reservoir 119 is in fluid communication with the injection ports by suitable passageways extending through the die dividing members defining the dough dividing passageways. It should then be appreciated that the additive is not simply placed at the outer surface of the flow of extrudable food material but is placed through the entire area and more even mixing of the additive with the extrudable food material can occur.

Apparatus 10 according to the teachings of the present invention further includes one or more middle segments 122 having a generally cylindrical outer surface in the most preferred form. Each middle segment 122 includes a plurality of axially extending subpassageways 124 of a number, location, and arrangement corresponding to passageways 90. Subpassageways 124 have a size smaller than die inserts 108. The first middle segment 122 is suitably secured to manifold 118 such as by the means shown with the upstream face of middle segment 122 abutting with downstream face 82 of manifold 118. It can then be appreciated that die inserts 108 are axially captured by being sandwiched between the upstream face of middle segment 122 and the upstream axial end of counterbores 110. Each subpassageway 124 contains a number of stationary in-line static mixer or flight elements 59.

In the most preferred form, each middle segment 122 is of a unique construction allowing access to static mixer elements 59. Specifically, in the most preferred form of the present invention, middle segment 122 is formed of a central plug 122a and an outer sleeve 122b. Central plug 122a has planar first and second ends, with the first end for abutment with downstream face 82 of manifold 118. Central plug 122a further includes an outer frustoconical surface. Sleeve 122b has planar first and second ends, with the first end for abutment with downstream face 82 of manifold 118. Sleeve 122b further includes an outer surface which is generally cylindrical in the preferred form and an inner frustoconical surface of a size and shape for slideably receiving and abutment with the outer frustoconical surface of central plug 122a. During the formation of middle segment 122, central plug 122a is slideably received in outer sleeve 122b with the outer frustoconical surface of central plug 122a abutting with the inner frustoconical surface of outer sleeve 122b. Subpassageways 124 which in the most preferred form are of a circular cross section are then bored or drilled with their axes generally located along the frustoconical surfaces of plug 122a and sleeve 122b so that generally half of each of the subpassageways 124 is formed in plug 122a and the other half is formed in sleeve 122b. It should then be appreciated that with the centers of subpassageways 124 located on the frustoconical surfaces of plugs 122a and sleeve 122b, the centers of subpassageways 124 have gradually decreasing spacing from the first ends to the second ends of plug 122a and sleeve 122b.

It should then be appreciated that in the event that one or more subpassageways 124 should become plugged, for example which could occur in the event of an extended power outage, it can be very difficult to nearly impossible to force the plugged dough with static mixer elements 59 axially through subpassageways 124. According to the teachings of the present invention, with middle segment 122 removed from apparatus 10, plug 122a can be forced out of sleeve 122b such that middle segment 122 is thus in two individual components. Typically, static mixer elements 59 and the plugged dough will remain in the halves of subpassageways 124 formed in sleeve 122b. Access can then be obtained along the entire longitudinal lengths of subpassageways 124 by reaching in the open ends of sleeve 122b or on the outer frustoconical surface of plug 122a. Thus, it can be appreciated that access is allowed to the interior of subpassageways 124, static mixer elements 59, and/or any dough located therein along the entire longitudinal lengths of subpassageways 124. Suitable handling bores can be provided in the ends of plug 122a to assist in the handling of plug 122a including when inserting or removing plug 122a from sleeve 122b. It should further be appreciated that the frustoconical shape of the outer surface of plug 122a and the inner surface of sleeve 122b is advantageous in creating increased spacing between such surfaces as sleeve 122b is moved downstream relative to plug 122a during disassembly of middle segment 122. Similarly, during operation of apparatus 10, dough flowing through subpassageways 124 will tend to push plug 122a downstream relative to sleeve 122b to more firmly abut the frustoconical surfaces of plug 122a and sleeve 122b together.

Each middle segment 122 includes first and second, axially spaced, annular shoulders 126 extending radially from the outer surface of sleeve 122b. Shoulders 126 in the preferred form are located adjacent to but slightly axially inward of the axial ends of middle segment 122 to allow securement of middle segment 122 to upstream and downstream elements. A water jacket 128 is partially formed by and held between shoulders 126 for circulation of a heat transfer medium such as water for adding heat to middle segment 122 and thus to the extrudable food material flowing through subpassageways 124 thereof.

Apparatus 10 according to the preferred teachings of the present invention includes a transition plate 130 having a plurality of axially extending bores 132 of a size, number, location, and arrangement corresponding to subpassageways 124 of middle segments 122. An adapter element 134 is suitably secured to transition plate 130 such as by bolts extending through element 134 and threaded into plate 130. The last middle segment 122 is suitably secured to adaptor element 134 such as by the means shown with the downstream face of middle section 122 abutting with the upstream face of adapter element 134. Adapter element 134 includes a plurality of axially extending bores 136 which can include wear sleeves of a size, number, location, arrangement, and extending between bores 132 and subpassageways 124.

In apparatus 10, die head 30 is generally cup shaped and is suitably secured to the opposite side of transition plate 130 than adapter element 134 such as by the means shown. Die ports 40 are provided in outer die face 31. According to the teachings of the present invention, a registration section 138 is provided having a shape and size corresponding to and for receipt within die head 30. Section 138 includes connecting passages 140 extending axially from and in communication with bores 132, with subpassages or connecting passages 140 having an interior surface of corresponding shape and size as bores 132 and extend from the upstream face towards but spaced from the downstream face of registration section 138. An interconnecting passage 240 extends between the upstream and downstream faces and equally intersects adjacent pair of connecting passages 140. Passages 240 are counterbored to define a shoulder 242 therein, generally intermediate the upstream and downstream faces of registration section 138. Each passage 240 is aligned with and in communication with an arcuate channel 243 at the downstream face of registration section 138. Each arcuate channel 243 is arcuate in a plane parallel to but spaced from the upstream and downstream faces of registration section 138. A plurality of die ports 40 are in fluid communication with each arcuate channel 243, with 18 die ports 40 provided in fluid communication with each channel 243 in the preferred form when three passages 240 and channels 243 are provided.

Apparatus 10 according to the teachings of the present invention further includes static mixers 244 received in passages 240 and in the preferred form are formed of two elements each of which is a KSM mixer marketed by Sulzer Chemtech. According to the teachings of the present invention, static mixers 244 have an operative length which is insufficient to provide homogenously colored dough streams such as performed by static mixer elements 59, but rather provides a random, non-homogenously colored dough stream and in the preferred form of a swirl. Static mixers 244 are received in passages 240, abut with shoulders 242 and have an axial length spaced upstream from the downstream face of registration section 138.

Apparatus 10 according to the teachings of the present invention further includes a transition element 246 corresponding to and slideably received in each passage 240. Each transition element 246 includes a plurality of sets of a plurality of subpassages 248 extending from the upstream face to the downstream face, with 4 sets each including 4 subpassages 248 in series parallel to and in a symmetrical arrangement to a diameter of transition element 246 extending through the axial centers of adjacent bores 132 being shown in the preferred embodiment. Transition element 246 further includes a plurality of channels 250A and 250B of a number corresponding to the sets of subpassages 248 extending from the upstream face towards but spaced from the downstream face, with channels 250A and 250B not intersecting each other. Channels 250A and 250B extend from a peripheral edge extending between the upstream and downstream faces of transition element 246 and in communication with one of the pair of connecting passages 140 but is not in communication with the other of the pair of connecting passages 140. In the preferred form, channels 250A and 250B extend parallel to the upstream and downstream faces of transition element 246, and subpassages 248 extend parallel to the peripheral edge of transition element 246. In this regard, transition element 246 in the preferred form shown is symmetrical about a diameter interconnecting the axial centers of connecting passages 140 in the preferred form shown. In the most preferred form, sets of subpassages 248 are arranged in a series parallel to the diameter interconnecting the axial center, with each series extending on both sides of an intersecting diameter extending perpendicular to the diameter interconnecting the axial centers of the pair of connecting passages 140.

In the preferred form shown, the center channels 250A adjacent the diameter interconnecting the axial centers of the pair of passages 140 generally extend parallel thereto. Each center channel 250A includes a first section 300 including first and second, spaced parallel walls 302 parallel to a diameter of transition element 246 and extending from the peripheral edge of transition element 246. Each center channel 250A further includes a second section 304 including a semicylindrical wall 306 extending between first and second walls 302 of first section 300. A last subpassage 248A of each channel 250A at a greatest spacing from the peripheral edge of transition element 246 includes a first portion 308 extending from the downstream face towards but spaced from the upstream face of transition element 246. First portion 308 has oval cross sections parallel to the upstream and downstream faces. Each subpassage 248A further includes a second portion 310 extending from upstream face to the downstream face and intersecting with the first portion. Section portion 310 has cross sections parallel to the upstream and downstream faces smaller than the oval cross sections of first portion 308. Second portion 310 in the preferred form shown is eye-shaped and located in the second section 304. In the preferred form shown, first and second portions 308 and 310 have a coextensive end surface.

The outer channels 250B spaced outwardly of the center channels 250A are J-shaped and intersect with the peripheral edge of transition element 246 such that the outer channels 250B are in part defined by connecting passages 140. Transition elements 246 and static mixers 244 are sandwiched between the downstream face of transition plate 130 and shoulders 242.

It should then be appreciated that passages 84, 86 and 140, axially extending passageways 90, axially extending bores 132 and 136, subpassageways 124, and ports 40 are generally contiguous and do not present shoulders or similar projections in the flow of extrudable food material to minimize buildup and hardening. Die head 30 is suitably secured to transition plate 130 such as by the means shown opposite to adapter element 134, with registration section 138 sandwiched between die head 30 and transition plate 130. Apparatus 10 further includes in the most preferred form shown a conventional face rotary cutter 36 having at least one rotating cutter knife 38 for severing the extrudate ropes into individual pieces.

Operation of apparatus 10 produces a number of dough substreams, with 6 being produced in the preferred form. It can then be appreciated that the admixed blend produced can be of two to six physical and/or compositional properties and/or at differing ratios. As an example, apparatus 10 could produce three dough substreams of red berry flavor, two dough substreams of purple grape flavor, and one dough substream of yellow lemon flavor. Specifically, product mass substreams are supplied from bores 132 into connecting passages 140. From passages 140 in communication with adjacent bores 132, first and second product mass substreams are directed into channels 250A and 250B at a non-parallel angle to the flow path through bores 132 and in the most preferred form generally perpendicular thereto. From channels 250A and 250B, first and second product mass substreams are directed through subpassages 248 of transition element 246 located in interconnecting passage 240. From subpassages 248, the first and second product mass substreams are directed to static mixers 244. While passing through static mixes 244, the first and second product mass substreams are mixed in a non-homogenous manner to create a swirl effect in the mixed mass stream. After static mixers 244, the mixed mass stream is directed from interconnecting passage 240 into arcuate channel 243 and then through die ports 40 in communication with interconnecting passage 240 by arcuate channel 243, with the mixed mass stream being cut by knife 38 into individual pieces.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An apparatus for producing a non-homogenously mixed extrudate, comprising, in combination: means for supplying a first product mass substream disposed within a first subpassageway having an interior surface and a second mass substream disposed within a second subpassageway having an interior surface; an interconnecting passage in communication with the first and second subpassageways; an exit port in communication with the interconnecting passage; a transition element including an upstream face, a downstream face, and a peripheral edge extending between the upstream and downstream faces, with the peripheral edge corresponding to and for slideable receipt in the interconnecting passage; first and second sets of subpassages extending between the upstream and downstream faces of the transition element; first and second channels extending from the upstream face towards but spaced from the downstream face, with the first channel being in communication with the first subpassageway and the first set of subpassages but not with the second subpassageway and the second set of subpassages, with the second channel being in communication with the second subpassageway and the second set of subpassages but not in communication with the first subpassageway and the first set of subpassages; and a static mixer located in the interconnecting passage intermediate the exit port and the downstream face of the transition element.

2. The apparatus of claim 1 wherein the interconnecting passage includes a shoulder, with the first and second subpassageways extending through a transition plate, with the transition element and the static mixer sandwiched between the shoulder in the interconnecting passage and the transition plate.

3. The apparatus of claim 1 wherein each of the first and second sets of subpassages include a plurality of subpassages.

4. The apparatus of claim 3 wherein the first and second sets of subpassages are symmetrical to a diameter of the transition element extending between axial centers of the first and second subpassageways.

5. The apparatus of claim 4 wherein each of the plurality of subpassages are arranged in a series parallel to the diameter.

6. The apparatus of claim 5 wherein the channels extend parallel to the upstream and downstream faces of the transition element and the first and second sets of subpassages extend parallel to the peripheral edge of the transition element.

7. The apparatus of claim 5 wherein the plurality of subpassages includes a last subpassage at a greatest spacing from the peripheral edge of the transition element, with the last subpassage including a first portion extending from the downstream face towards but spaced from the upstream face, with the first portion having oval cross sections parallel to the upstream and downstream faces, with the last subpassage including a second portion extending from the upstream face to the downstream face, with the second portion having cross sections parallel to the upstream and downstream faces smaller than the oval cross sections of the first portion, with the second portion intersecting with the first portion.

8. The apparatus of claim 7 wherein the cross sections of the second portion are eye-shaped, with the first and second portions having a coextensive end surface.

9. The apparatus of claim 7 wherein each of the first and second channels includes a first section and a second section, with the first section including first and second, spaced, parallel walls parallel to the diameter and extending from the peripheral edge, with the second section including a semicylindrical wall extending between the first and second walls of the first section, with the second portion of the last subpassage located within the second section.

10. The apparatus of claim 9 further comprising, in combination: third and fourth channels extending from the upstream face towards but spaced from the downstream face and spaced from the first and second channels, with the first and second channels located intermediate the third and fourth channels, with the third and fourth channels being J-shaped parallel to the upstream and downstream faces and intersecting with the peripheral edge; and third and fourth sets of subpassages extending between the upstream and downstream faces, with the third channel being in communication with the first subpassageway and the third set of subpassages but not with the second subpassageway and the first, second, and fourth subpassages, with the fourth channel being in communication with the second subpassageway and the fourth set of subpassages but not in communication with the first subpassageway and the first, second and third sets of subpassages.

11. The apparatus of claim 10 further comprising, in combination: an arcuate channel in communication with the interconnecting passage, with the arcuate channel being arcuate in a plane parallel to but spaced from the upstream and downstream faces of the transition element, with the exit port comprising a plurality of die ports each in fluid communication with the arcuate channel.

12. The apparatus of claim 4 wherein each of the plurality of subpassages is arranged in first and second series parallel to each other and a diameter.

13. The apparatus of claim 1 further comprising, in combination: an arcuate channel in communication with the interconnecting passage, with the arcuate channel being arcuate in a plane parallel to but spaced from the upstream and downstream faces of the transition element, with the exit port comprising a plurality of die ports each in fluid communication with the arcuate channel.

\* \* \* \* \*